(12) United States Patent
Timm (10) Patent No.: US 12,145,057 B2
(45) Date of Patent: *Nov. 19, 2024

(54) ATTENTION-BASED AI DETERMINATION OF PLAYER CHOICES

(71) Applicant: Sony Interactive Entertainment LLC, San Mateo, CA (US)

(72) Inventor: Paul Timm, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/738,535

(22) Filed: May 6, 2022

(65) Prior Publication Data

US 2022/0258045 A1 Aug. 18, 2022

Related U.S. Application Data

(63) Continuation of application No. 15/702,483, filed on Sep. 12, 2017, now Pat. No. 11,351,453.

(51) Int. Cl.
*G06F 3/0484* (2022.01)
*A63F 13/212* (2014.01)
(Continued)

(52) U.S. Cl.
CPC .......... *A63F 13/428* (2014.09); *A63F 13/212* (2014.09); *A63F 13/213* (2014.09);
(Continued)

(58) Field of Classification Search
CPC ...... A63F 13/04; A63F 13/219; A63F 13/426; A63F 13/47; G06F 3/012; G06F 3/013;
(Continued)

(56) References Cited

U.S. PATENT DOCUMENTS 6,152,563 A 11/2000 Hutchinson et al.
6,821,206 B1 11/2004 Ishida et al.
(Continued)

FOREIGN PATENT DOCUMENTS

JP 2017134601 A 8/2017

OTHER PUBLICATIONS

"Starcraft Broodwar—Wikipedia ". From Wikipedia, The Free Encylopedia. [dated Aug. 14, 2017]. [online], [retrieved on Apr. 7, 2020]. Retrieved from the Internet . 8 pages.
(Continued)

*Primary Examiner* — Lawrence S Galka
(74) *Attorney, Agent, or Firm* — John L. Rogitz; John M. Rogitz (57) ABSTRACT

Using a camera or other tracking hardware, the attention of a player of a computer game (based on gaze direction, for instance) is tracked at key/predetermined points during game play. For example, when the player enters a new area in the game such as a simulated room, town, etc., it is determined what the player's gaze focuses on more, e.g., a dog huddled in the corner, a nobleman with obvious signs of wealth, or a shifty appearing figure in the shadows. Based on this input, one or more factors of future gameplay are determined, such as an order in which to present encounters/challenges, adjusting a character's "morality" score/flag, adjusting bonuses/penalties to non-player character (NPC) interactions, etc.

12 Claims, 5 Drawing Sheets

(51) Int. Cl.
| | |
|---|---|
| A63F 13/213 | (2014.01) |
| A63F 13/25 | (2014.01) |
| A63F 13/26 | (2014.01) |
| A63F 13/426 | (2014.01) |
| A63F 13/428 | (2014.01) |
| A63F 13/46 | (2014.01) |
| A63F 13/53 | (2014.01) |
| A63F 13/798 | (2014.01) |
| G06F 3/01 | (2006.01) |
| G06F 3/0481 | (2022.01) |
| G06F 3/04842 | (2022.01) |
| A63F 13/211 | (2014.01) |
| A63F 13/217 | (2014.01) |

(52) U.S. Cl.
CPC .............. *A63F 13/25* (2014.09); *A63F 13/26* (2014.09); *A63F 13/426* (2014.09); *A63F 13/46* (2014.09); *A63F 13/53* (2014.09); *A63F 13/798* (2014.09); *G06F 3/011* (2013.01); *G06F 3/04842* (2013.01); *A63F 13/211* (2014.09); *A63F 13/217* (2014.09); *A63F 2300/1093* (2013.01); *A63F 2300/8082* (2013.01); *G06F 3/013* (2013.01)

(58) Field of Classification Search
CPC .... G06F 3/0481; G06F 3/04842; G06F 3/005; G07F 17/3206
See application file for complete search history.

(56) References Cited

U.S. PATENT DOCUMENTS

| | | | |
|---|---|---|---|
| 9,442,631 | B1 | 9/2016 | Patel et al. |
| 2005/0282603 | A1 | 12/2005 | Parrott et al. |
| 2011/0175932 | A1 | 7/2011 | Yu et al. |
| 2012/0105486 | A1 | 5/2012 | Lankford et al. |
| 2012/0256967 | A1 | 10/2012 | Baldwin et al. |
| 2012/0295708 | A1 | 11/2012 | Hernandez-Abrego et al. |
| 2014/0176813 | A1 | 6/2014 | Conness et al. |
| 2014/0184550 | A1 | 7/2014 | Hennessey et al. |
| 2015/0012827 | A1* | 1/2015 | Elmeih ................ G06F 1/1694 715/719 |
| 2015/0130716 | A1 | 5/2015 | Sridharan et al. |
| 2015/0185475 | A1* | 7/2015 | Saarikko ............ G02B 6/02085 382/117 |
| 2015/0193005 | A1 | 7/2015 | Censo et al. |
| 2015/0199030 | A1 | 7/2015 | Mikkola et al. |
| 2015/0310657 | A1 | 10/2015 | Eden |
| 2015/0348358 | A1 | 12/2015 | Comeau et al. |
| 2016/0232399 | A1 | 8/2016 | Kempinski et al. |
| 2017/0165573 | A1 | 6/2017 | Froy et al. |
| 2017/0182414 | A1 | 6/2017 | Oishi et al. |
| 2018/0028917 | A1* | 2/2018 | Poerschke ............... A63F 13/25 |
| 2018/0173417 | A1 | 6/2018 | Foresti |

OTHER PUBLICATIONS

"Starcraft: Broodwar—Episode IV: Protoss—Mission 1: Escape from Aiur", [dated 2014]. [online], [retrieved Jun. 10, 2020]. Retrieved from the Internet . 4 pages.

"Starcraft: Broodwar—Episode V: Terran—Mission 1: First Strike", [dated 2014]. [online], [retrieved Jun. 10, 2020]. Retrieved from the Internet . 4 pages.

"Wikipedia Asteroids". From Wikipedia, The Free Encylopedia. [dated Aug. 25, 2017]. [online], [retrieved on May 6, 2019]. Retrieved from the Internet . https:// en.wikipedia.org/w/index.php?title=Asteroids_(video_game)&oldid=797.

"Wizardry Wiki Getting Started". From strategywiki .org via The Way Back Machine (www.archive.org). [dated Aug. 1, 2016]. [online], [ retrieved on May 6, 2019]. Retrieved from the Internet. https://web.archive.org/web/20160801055005/http:l/strategywiki .org/wiki/Wizardry:_Proving_Grounds_of_the_Mad_Overlord/Floor.

"Wizardry Wiki Getting Started". From strategywiki .org via The Way Back Machine (www.archive.org). [dated Aug. 14, 2016]. [online], [ retrieved on May 6, 2019]. https://web.archive.org/web/20160814143305/http:l/strategywiki.org/wiki/Wizardry:_Proving_Grounds_of_the_Mad_ Overlord/Getting_ Started 5 pages.

"Wizardry Wiki". From strategywiki.org via The Way Back Machine (www.archive.org). [dated Sep. 26, 2016]. [online], [retrieved on May 6, 2019]. https://web.archive.org/web/20160926145718/https://strategywiki .org/wiki/Wizardry:_Proving_Grounds_of_the_Mad_Overlord 4 pages.

* cited by examiner

FIG. 1

FIG. 2 VR Headset

FIG. 5 Modifying game execution (examples)

ATTENTION-BASED AI DETERMINATION OF PLAYER CHOICES

FIELD

The present application relates to technically inventive, non-routine solutions that are necessarily rooted in computer technology and that produce concrete technical improvements.

BACKGROUND

As understood herein, in computer games, player decisions have to be determined by the game console via player input (usually pressing a button). As also understood herein, this telegraphs to the player that a decision is being made which itself can influence the player's decision.

SUMMARY

As further understood herein, a non-direct input method that is completely non-intrusive to the player's experience is desirable to alter computer game play based on spontaneous player attention.

Accordingly, a device includes at least one computer memory that is not a transitory signal and that includes instructions executable by at least one processor to receive from a camera at least one image of a player of a computer game. The instructions are executable to, based at least in part on the image, determine a direction of gaze of the player, correlate the direction of gaze to at least one object in the computer game to establish a correlation, and use the correlation to determine a game path to present to the player, and/or a dialog to present to the player, and/or a player skill attribute. The instructions also are executable to present the game path to the player, and/or present the dialog to the player, and/or alter a skill associated with the player according to the player skill attribute.

In example embodiments, the instructions may be executable to correlate the direction of gaze to at least one object in the computer game to establish a correlation at least in part based on accessing information the computer game indicating locations of objects in at least one keystone scene. The camera can be supported by a computer game headset wearable by the player.

In example embodiments, the instructions may be executable to establish the correlation at least in part based on a number of times greater than one that the direction of gaze is directed to the at least one object. In non-limiting examples, the instructions are executable to establish the correlation at least in part based on a class of the at least one object.

In another aspect, an apparatus includes at least one computer storage with instructions executable by at least one processor, and at least one processor configured to access the instructions for receiving from a device at least one indication signal that is not a computer game input signal. The indication signal indicates attention of a player to an element of a computer game. The instructions are executable for, based at least in part on the indication signal, determining an attention of the player, correlating the attention of the player to at least one object in the computer game to establish a correlation, and then using the correlation to determine a game path to present to the player, and/or a dialog to present to the player, and/or a player skill attribute. The instructions may be executable for presenting the game path to the player, and/or presenting the dialog to the player, and/or altering a skill associated with the player according to the player skill attribute.

In another aspect, a method includes receiving at least one indication signal that is not a computer game input signal, and based at least in part on the indication signal, determining an attention of the player. The method includes correlating the attention of the player to at least one object in a computer game to establish a correlation. The method further includes using the correlation to alter presentation of the computer game.

The details of the present application, both as to its structure and operation, can best be understood in reference to the accompanying drawings, in which like reference numerals refer to like parts, and in which:

BRIEF DESCRIPTION OF THE DRAWINGS

FIGS. 6 and 7 schematically illustrate altering game paths based on which object a player attends to.

DETAILED DESCRIPTION

This disclosure relates generally to computer ecosystems including aspects of consumer electronics (CE) device networks such as but not limited to distributed computer game networks.

A system herein may include server and client components, connected over a network such that data may be exchanged between the client and server components. The client components may include one or more computing devices including game consoles such as but not limited to Sony PlayStation™ and Microsoft Xbox™, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a computer game console system with display or an Internet-enabled TV with a TV tuner (equivalently, set top box controlling a TV). However, the AVD 12 alternatively may be an appliance or household item, e.g., computerized Internet enabled refrigerator, washer, or dryer. The AVD 12 alternatively may also be a computerized Internet enabled ("smart") telephone, a tablet computer, a notebook computer, a wearable computerized device such as e.g., computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
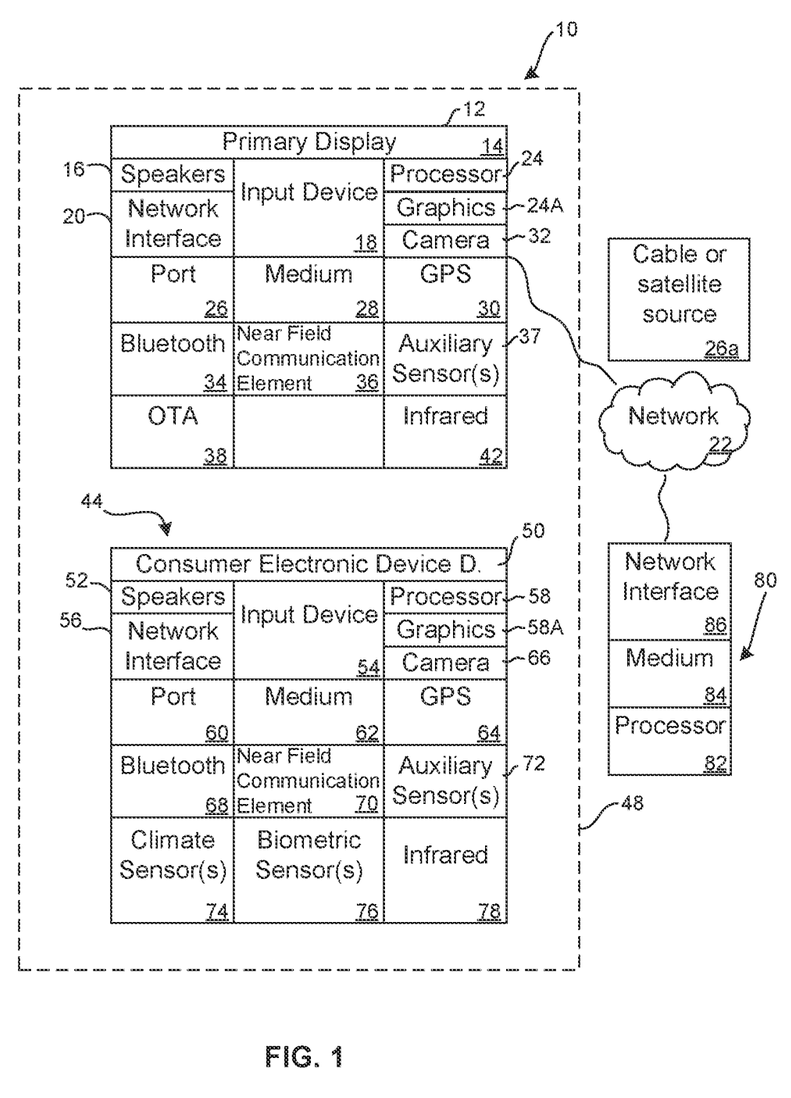
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g., an audio receiver/microphone for e.g., entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g., controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high-definition multimedia interface (HDMI) port or a USB port to physically connect (e.g., using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g., receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g., determine the location of the AVD 12 in e.g., all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Figure 2:
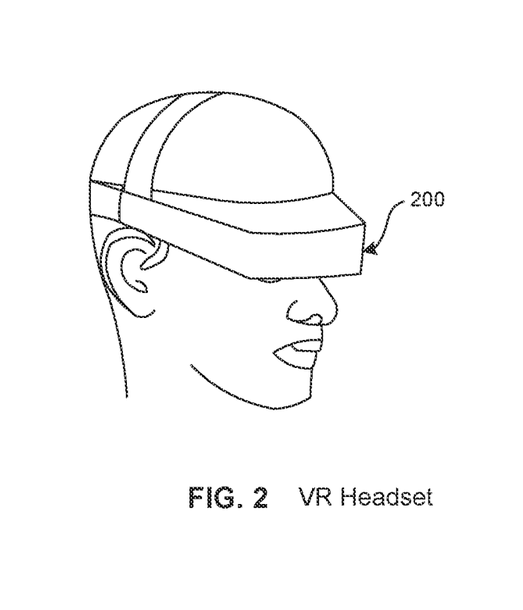
FIG. 2 is diagram of a computer game headset that may be employed consistent with present principles.

Still referring to FIG. 1, in addition to the AVD 12, the system 10 may include one or more other CE device types. In one example, a first CE device 44 may be used to control the display via commands sent through the below-described server while a second CE device such as the source 26a may include similar components as the first CE device 44 and hence will not be discussed in detail. Fewer or greater devices may be used. As alluded to above, a CE device may be implemented by a game console. Or, one or more of the CE devices may be implemented by a computer game headset such as the example headset 200 shown in FIG. 2.

In the example shown, to illustrate present principles all the devices are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 26a without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g., an audio receiver/microphone for e.g., entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as a graphics processor 58a for controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g., determine the location of the first CE device 44 in e.g., all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as e.g., one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

CE devices may include some or all of the components shown for the CE device 44. CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Figure 3:
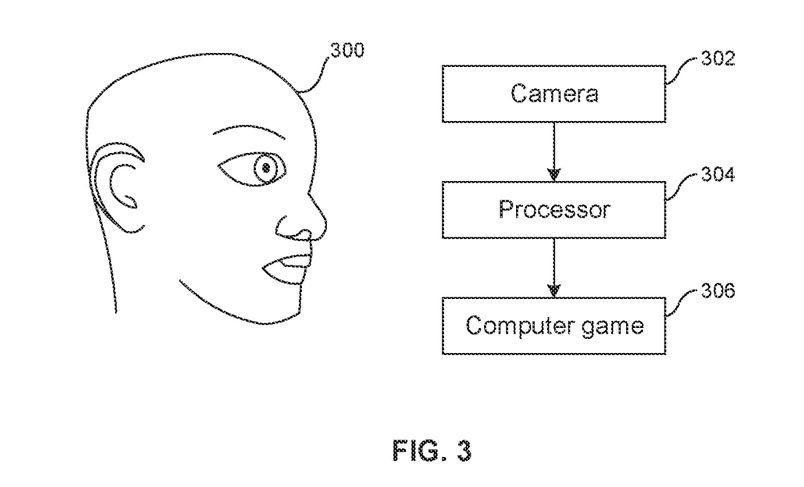
FIG. 3 is a block diagram of a simplified example system consistent with present principles.

FIG. 3 schematically shows that a player 300 of a computer game may be imaged by one or more cameras 302. The camera 302 may be mounted on the headset 200 in FIG. 2 or a computer game console implementing one of the devices in FIG. 1 or another device such as a display device. Images from the camera 302 are sent to one or more processors 304 accessing one or more computer games 306. The processor 304 may be part of a computer game console. As set forth further below, the processor 304 determine from the camera image the direction of gaze of the player 300 using eye-tracking image recognition to determine what object in the computer game the player is looking at.

In other implementations, in lieu of or in addition to using an image of the player 300, the processor 304 may determine that the player, by means of, e.g., a game controller, is hovering a screen cursor over an object in a computer game (preferably without highlighting the hovered-over object). In both cases the signal used by the processor indicates the attention of the player but it not a computer game input signal as would be input by, e.g., the player pressing a key on a game controller.

Figure 4:
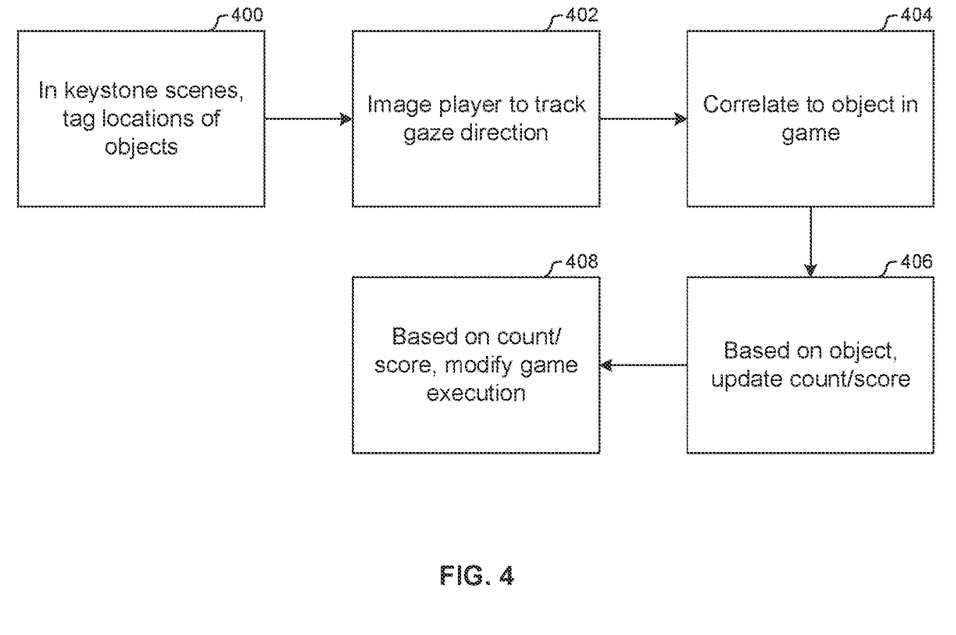
FIG. 4 is a flow chart of example attention tracking logic consistent with present principles.

FIG. 4 illustrates example logic for determining the player's attention based on camera images, it being understood that the same logic may use cursor hovers to determine player attention. Commencing at block 400, locations in the computer game of one or more game objects such as game characters are tagged in one or more key scenes of the game. A key scene may be any frame of the game, for example. The locations may be tagged by indicating in metadata the location within the key scene of each object being tagged.

Proceeding to block 402, the attention of the player is identified. In one example, this is done by imaging the player's eyes and executing eye tracking image recognition to determine a direction of the player's gaze. In another implementation, the player's attention may be identified by determining where in the game scene the player is hovering a screen cursor. Block 402 may be continuously executed or executed only upon certain time periods or game events, as when the player enters a new area in the game such as a simulated room, town, etc.

Moving to block 404, the player's attention is correlated to an object in the commuter game. When eye tracking is used, this may be done by determining, based on the direction of the player's gaze, the location of the game frame the player is looking at, in some cases based on the assumption that the display presenting the game is located directly in front of the player's face. That location is then used as entering argument into the metadata from block 400 to determine the object the player is looking at. When a cursor hover is used, the object over which the cursor is hovering is correlated to the player's attention.

From block 404 the logic may move to block 406 to update a count or score based on the object correlated at block 404. For example, it may be noted that the player is focused on a particular type of object and the number of discrete times, typically greater than one, that the player has focused on that object and/or type is updated. As examples, it may be noted that the player predominantly focuses on battle items, or in contrast predominantly focuses on emotional items such as puppies. The counts can be weighted, such that, for example, focus on a particular object may count twice what focus on another object counts, to establish relative importances as between objects with respect to game play execution. As the player progresses through one or more games, a machine learning algorithm can identify what types of objects the player tends to pay attention to and alter game execution accordingly.

Figure 5:
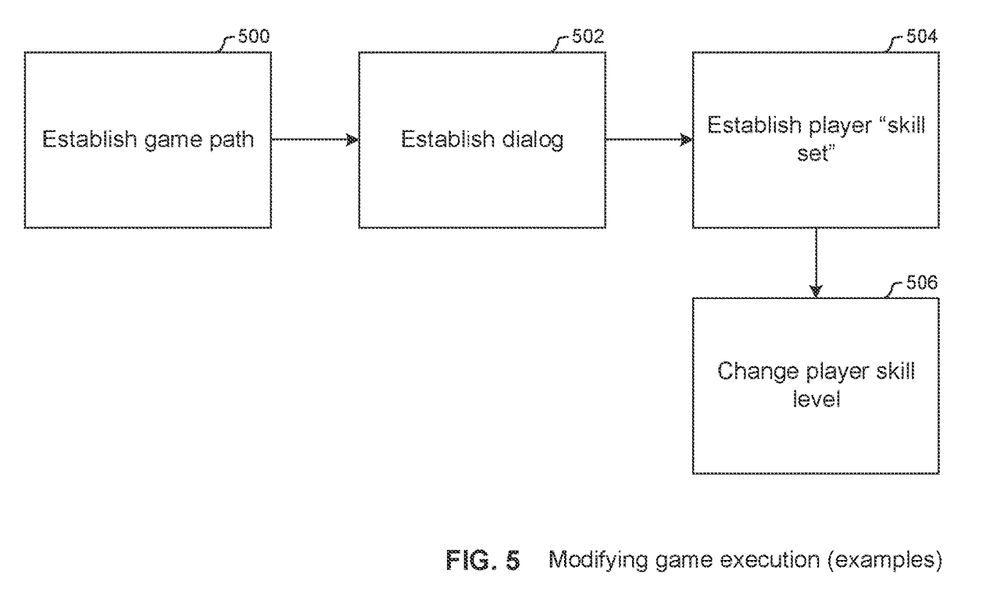
FIG. 5 is a flow chart of example game altering logic consistent with present principles.

At block 408, based on the count/score, game execution can be modified. FIG. 5 provides examples.

Commencing at block 500, based on the count/score (correlation of player attention to an object) from FIG. 4, a game path is established. Typical computer games provide various game paths branching from whatever game path the player typically is in. Thus, in contrast to establishing the game path into which the game will branch based on a player imputing gaming signals via game controller, in FIG. 5 the path is established based at least in part on where the player's attention is focused. For example, in a simplified example a first sequence of character encounters/challenges may be presented based on the player's attention being focused on a first object whereas a second sequence of character encounters/challenges may be presented based on the player's attention being focused on a second object.

Likewise, at block 502 a dialog audibly presented to the player on speakers may be established based on the attention correlation of FIG. 4. For example, in a simplified example a first dialog may be presented based on the player's attention being focused on a first object whereas a second dialog may be presented based on the player's attention being focused on a second object.

Still further, at block 504 game execution may be modified by establishing, based on the attention focus logic of FIG. 4, the player's skill level or other gamer attribute such as the player's (or character representing the player) "morality" score/flag, adjusting bonuses/penalties to non-player character (NPC) interactions, etc. As further examples, if it is noted that the player's attention is focused on other players' characters, the player's skill indication may be "leader". In any case, these player character attributes may be used in awarding bonus points that in turn may be used in presenting the next higher level of the game play, etc. As player attention is tracked, the skill level of the player may be changed a block 506.

Figure 6:
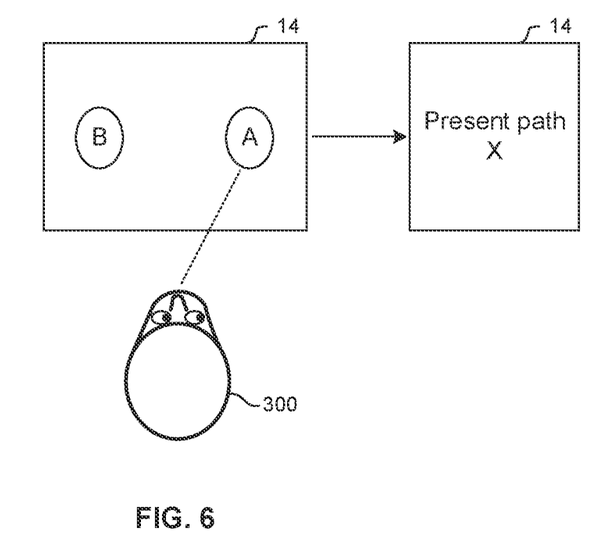
Figure 7:
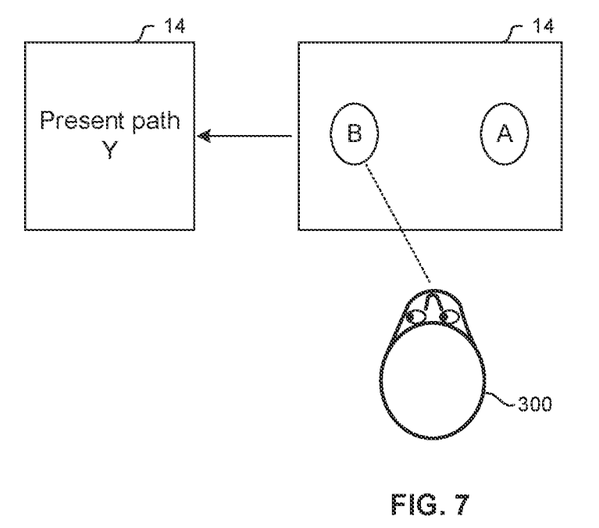

Turn now to FIGS. 6 and 7, in which it is assumed that eye tracking is used to determine the player's focus of attention on objects in a computer game being presented on a display such as the display 14 shown in FIG. 1. In FIG. 6, the player 300 is gazing at object "A", which causes game path "X" subsequently to be presented on the display. In contrast, in FIG. 7, the player 300 is gazing at object "B", which causes game path "Y" subsequently to be presented on the display. It will readily be appreciated that the same principles may be used for the other game execution alterations discussed above, such that, for example, focus on object "A" causes dialog "M" to be played on speakers whereas focus on object "B" causes dialog "N" to be played on speakers.

It will be appreciated that whilst present principals have been described with reference to some example embodiments, these are not intended to be limiting, and that various alternative arrangements may be used to implement the subject matter claimed herein.

What is claimed is:

1. A device comprising:
at least one processor configured with instructions to:
receive from a camera at least one image of a player of a computer simulation;
based at least in part on the image, determine a direction of gaze of the player toward a scene of the computer simulation;
responsive to the direction of gaze correlating to a location of an object in the scene, identify the object at least in part based on metadata associated with the computer simulation;
present at a first time a first sequence of character encounters based on the object being a first object;
present at the first time a second sequence of character encounters based on the object being a second object;
use the direction of gaze to determine a player skill attribute; and
alter a skill associated with the player according to the player skill attribute.

2. An apparatus comprising:
at least one processor configured for:
receiving from a device at least one indication signal that is not a computer simulation input signal, the at least one indication signal indicating attention of a player to an element of a computer simulation;
based at least in part on the indication, determining an attention of the player;
correlating the attention of the player to at least a first object;
updating first a count or score based on a number of discrete times greater than one that the player has focused on the first object and/or its type of object;
applying a first weight to the first count;
correlating the attention of the player to at least a second object;
updating a second count or score based on a number of discrete times greater than one that the player has focused on the second object and/or its type of object;
applying a second weight to the second count;
presenting at a first time a first sequence of character encounters based on the first count with the first weight applied being greater than the second with the second weight applied; and
presenting at the first time a second sequence of character encounters based on the first count with the first weight applied being less than the second with the second weight applied.

3. The apparatus of claim 2, wherein the device is a camera and the indication signal comprises at least one image of the player.

4. The apparatus of claim 2, wherein the device is a processor and the indication signal comprises at least cursor hover signal.

5. The apparatus of claim 2, wherein the processor is programmed for:
using correlation of player gaze-to-object to determine a dialog to present to the player; and
presenting the dialog to the player.

6. The apparatus of claim 2, wherein the processor is programmed for:
considering player attention to objects only in key scenes of the computer simulation.

7. The apparatus of claim 4, wherein the instructions are executable for:
establishing a player gaze-to-object correlation at least in part based on a class of the at least one object.

8. A method, comprising:
receiving at least one indication signal that is not a computer simulation input signal;
based at least in part on the indication signal, determining a first attention of the player;
correlating the first attention of the player to at least a first object in a computer simulation;
determining a second attention of the player;
correlating the second attention to at least a second object in the computer simulation;
presenting at a first time a first set of encounters responsive to correlating the first attention of the player to the first object;
presenting at the first time a second sequence of encounters responsive to correlating the second attention of the player to the second object;
modifying execution of the computer simulation by establishing, based on the attention of the player, a skill level or morality score.

9. The method of claim 8, comprising:
using the correlation to determine a player skill attribute; and
altering a skill associated with the player according to the player skill attribute.

10. The method of claim 8, comprising:
using a correlation of player attention to object to determine at least one of: a simulation path to present to the player, a dialog to present to the player, a player skill attribute; and executing at least one of: presenting the simulation path to the player, presenting the dialog to the player, altering a skill associated with the player according to the player skill attribute.

11. The method of claim 8, comprising responsive to the player's attention being focused on other players' characters, indicate the player's skill to be leader.

12. The method of claim 8, comprising, based on the skill, awarding bonus points for presenting a next higher level of the game play.

* * * * *